Figure 1:
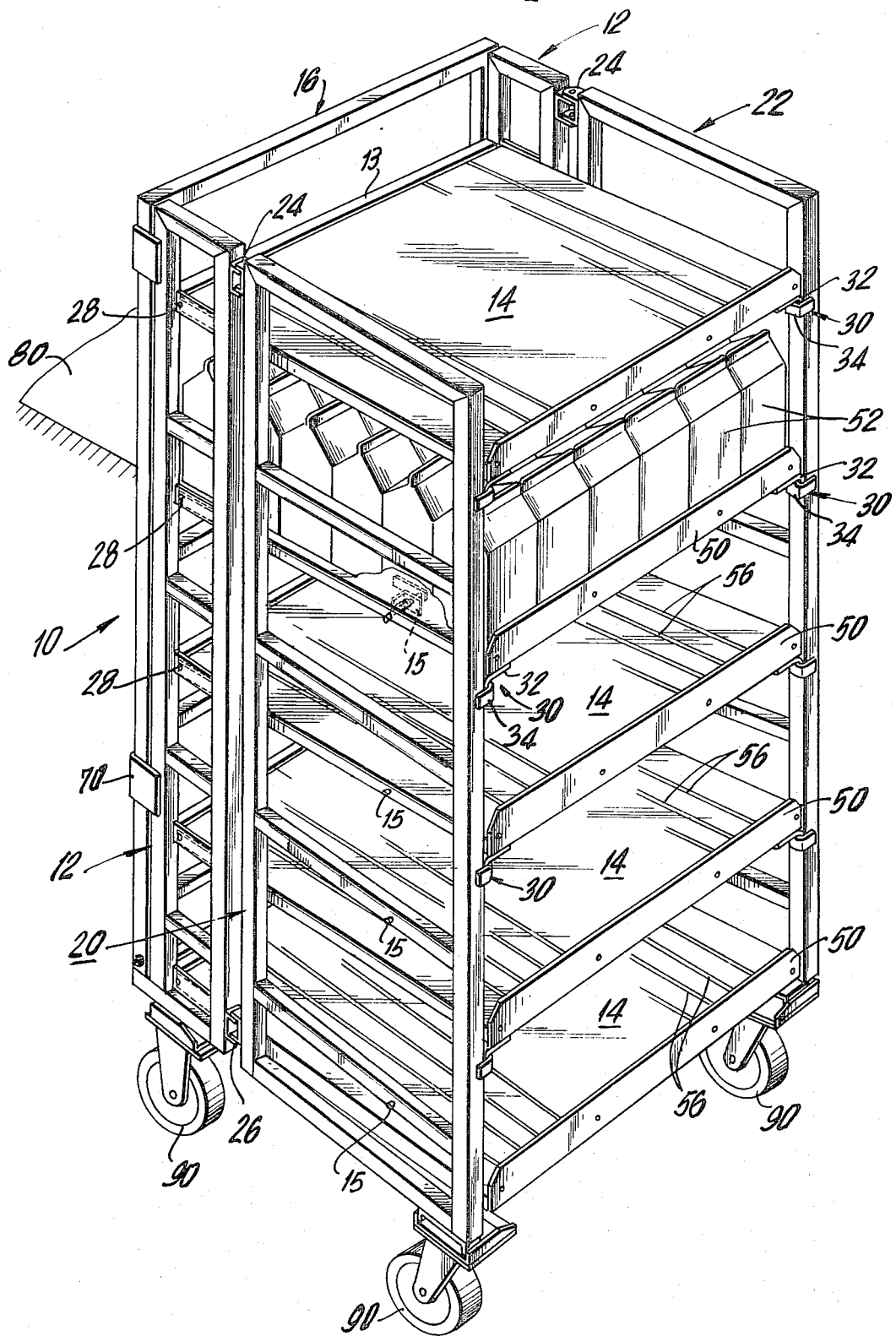

United States Patent

Swick, Jr. et al.

[11] 3,797,842
[45] Mar. 19, 1974

[54] TRANSFER CART

[75] Inventors: George E. Swick, Jr., Edina;
Ellsworth H. Danielson; Theodore W. Taylor, both of St. Paul, all of Minn.

[73] Assignee: The Cornelius Company, Minneapolis, Minn.

[22] Filed: June 14, 1972

[21] Appl. No.: 262,914

[52] U.S. Cl. ............ 280/36 R, 280/47.35, 280/79.3, 211/126, 211/148
[51] Int. Cl. ............................................ B62b 11/00
[58] Field of Search ............... 280/79.3, 79.2, 47.35, 280/36 R; 211/134, 126, 148; 312/250

[56] References Cited
UNITED STATES PATENTS

| | | | |
|---|---|---|---|
| 3,628,807 | 12/1971 | Fullington | 280/79.3 |
| 3,272,528 | 9/1966 | Young | 280/79.3 |
| 2,716,495 | 8/1955 | Prevette | 280/79.3 |
| 2,637,445 | 5/1953 | Patterson | 280/79.3 |

Primary Examiner—Robert R. Song

[57] ABSTRACT

The disclosure relates to a wheeled cart of the collapsible type which is intended for use in handling large food containers, such as milk containers. The cart is specifically characterized by inclined shelves which slope downwardly from the front of the cart toward the rear portion which is provided with a slidably mounted ladder or gate. The forward edge of each shelf includes a lip or partition which prevents the milk products from being pushed off the shelf. Horizontal bars or rungs of the gate are spaced such that, with the gate fully retracted, the rungs prevent the withdrawal of milk products from the rear of the cart, whereas when the gate is extended vertically upwardly, the rungs do not interfere with the enlarged openings needed for loading the milk products onto the shelves from the rear of the cart.

9 Claims, 3 Drawing Figures

TRANSFER CART

The present invention provides a lightweight, sturdy cart which is adapted to be collapsed to occupy a minimum amount of space, and when in the open position, includes a plurality of inclined shelves, and a moveable back portion which will enable the ready loading of food products onto the inclined shelves. In addition, the back portion may be moved to a retracted position wherein it functions to prevent the food products from falling off the cart.

In order to expedite the handling of various food products from the plant to the retail outlet, the trend has been to provide carts onto which the food products are directly loaded, after which the carts are wheeled onto a vehicle for transportation to the retail outlet. At the retail outlet, the wheeled cart is moved into place in an aisle of the store, and the consumer removes the food products from the cart. When the food products have been completely removed from the cart, the cart is collapsed for minimum storage space and returned to the plant. Accordingly, a minimum amount of handling of the food products is required, thereby decreasing the cost of providing the foodstuffs to the consumer.

One of the primary industries which has resorted to the use of collapsible carts is the milk industry, and developments are presently under way for designing various types of automatic loading machines for use in the milk plants to load the collapsible carts. The concept of employing collapsible carts is particularly suitable for use in the handling of milk containers which are extremely heavy and bulky, and yet relatively fragile. Heretofore, the type of collapsible carts that have been used for the transporting of milk have been of the type which includes several horizontal shelves, each of which has a lip at both the front and the rear portion thereof. The provision of a lip at the rear portion greatly complicates the loading of the milk containers in that the milk products must be loaded over the lip and then onto the shelf. As a result, present systems use a "shovel" device that is loaded with several containers of milk. The "shovel" reaches into the cart over the lip, after which a bar holds the milk and the "shovel" is withdrawn, at which time the milk drops into place onto the shelf. Because of the fact that the milk is heavy, only one half of the depth of the shelf is loaded in each loading operation. Thus, the cart must be turned around, and loaded from the front, again using the shovel and bar concept. Furthermore, presently available carts include a divider located half way between the front and rear lips of each shelf. Although this divider is helpful during the loading operation, it creates a problem at the retail outlet. More particularly, consumers are readily able to remove the milk containers from the cart along the front half of each shelf by merely lifting the milk product over the front lip. However, as milk is removed, it is difficult to remove the milk containers from the back of the cart over the center divider, whereby the practice has been for the retail outlet to have to remove the cart from its position in the refrigerator, and turn it around to make the back half of the cart readily available to the consumer.

Accordingly, it is an object of the present invention to overcome the shortcomings of known collapsible carts used for the handling and transporting of food products such as milk. It is another object of this invention to provide a transfer cart which may be loaded from one end, and which includes inclined shelves to aid in the loading of the foodstuffs on the cart.

It is still a further object of this invention to provide a transfer cart including a moveable back portion which facilitates loading, and which functions to prevent the inadvertent toppling of foodstuffs from the cart when in use.

It is another object of this invention to provide a transfer cart which minimizes the amount of handling of foodstuffs, and manipulation of the cart in transporting the foodstuffs from the plant to a consumer.

The transfer cart of the subject invention generally comprises a collapsible cart having a plurality of inclined shelves, inclined from the front of the cart toward the rear, with a ladder or gate slidably mounted along the rear portion of the cart, and with the vertical spacing between the horizontal rungs of the gate corresponding to the vertical spacing between the shelves. When the gate is fully retracted, the rungs are disposed between shelves thereby preventing the removal of foodstuffs loaded on the shelves, however during a loading operation, the gate is slid vertically upwardly, whereby the rungs are aligned with the shelves to enable the loading machine to align its loading platform with the shelf, and the milk or foodstuffs is pushed into the cart, thus completing the loading of a complete shelf in one operation. There is no rear or center lip or partition to work around, and after the cart is fully loaded, the gate is lowered and the milk is restrained from being removed from the rear of the cart. The rearwardly sloping shelves aid in keeping the milk or foodstuffs in place during handling of the cart, as it is loaded onto a truck and subsequently loaded into a refrigerator in a retail outlet. A lip extends along the forward edge of each shelf to prevent milk from toppling. Of course, the sloping shelf also aids in preventing milk from toppling out through the front portion of the cart.

At the retail outlet, a customer merely reaches into the cart to remove the milk, and if desired, instead of having to turn the entire cart 180°, a stock boy can aid the consumer in removing the milk by merely pushing the milk forward toward the forward lip as the milk products are removed.

Figures 2, 3:
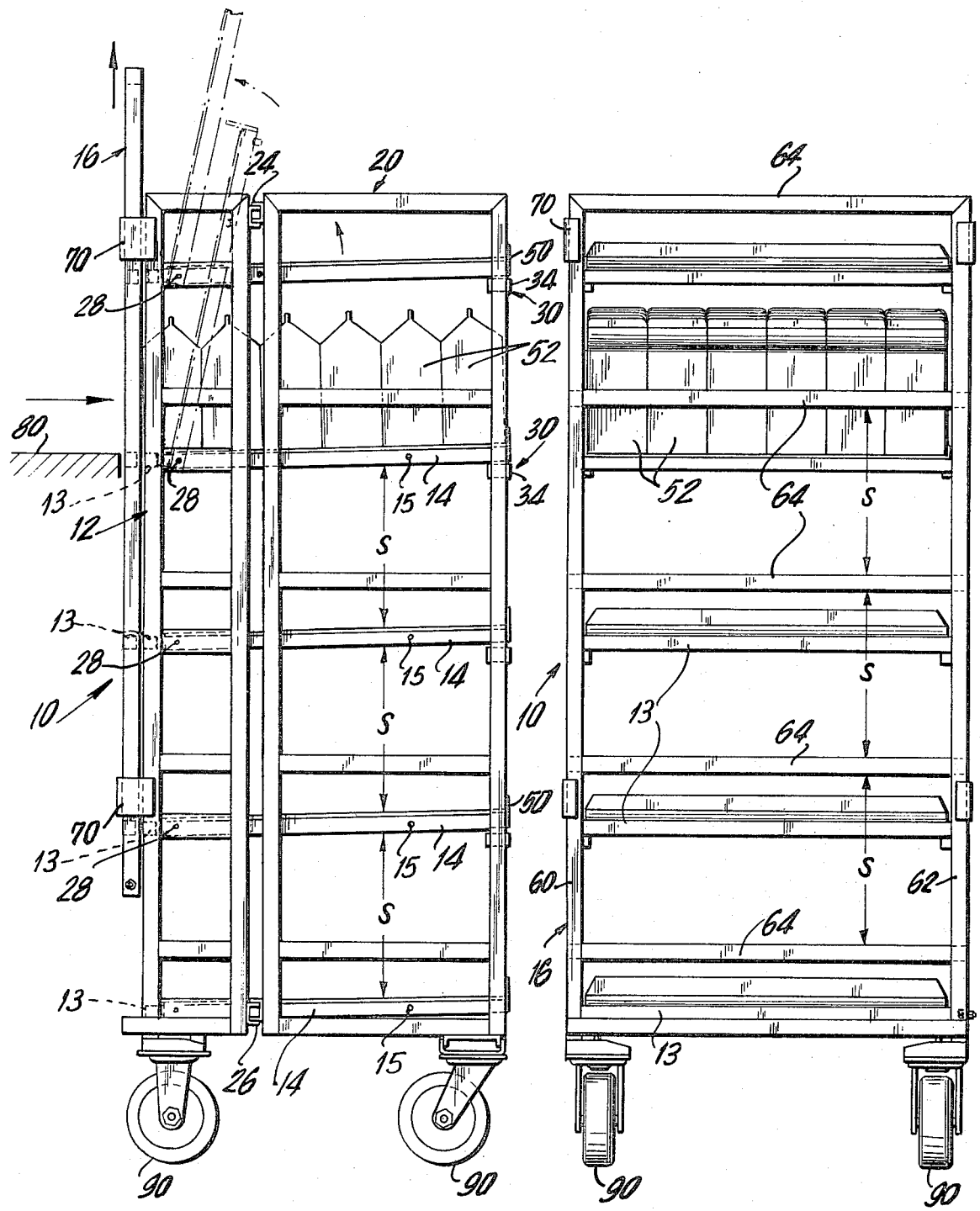

The invention includes the various novel features of construction and arrangement hereinafter disclosed with reference to the accompanying drawings in which:

FIG. 1 is a perspective view of the transfer cart of the subject invention;

FIG. 2 is a side view of the transfer cart of the subject invention, with the gate being moved to its vertical "loading" position, and with two of the shelves being shown in dotted lines in their collapsed positions; and FIG. 3 is a back view of the transfer cart of the subject invention with the gate moved to its fully retracted position for transporting of the foodstuffs from the plant to the retail outlet, and during the time when the foodstuffs are being removed from the shelves by the consumer.

Referring to FIGS. 1 through 3, the transfer cart basically comprises a vertically extending main frame 10 defined by a back portion including two vertical structures 12,12 interconnected by horizontal bars 13, two vertical side frame structures 20,22, a plurality of product support shelves 14 extending between said side frame structures, and a gate number 16. Each vertical side frame structure 20,22 is pivotally connected to the associated vertical structure 12 by upper hinge 24 and lower hinge 26. The product support shelves 14 extend transversely between the side structures of the main frame and are supported thereby. More particularly, along the back portion of the main frame 10 each shelf 14 is pivotally connected to the side structures 12,12 at pivot points 28,28, whereas along the front protion of the main frame 10, the product support shelves are engaged with the side frame structures 20,22 by latching means 30. The latter comprises L-shaped clip members 32 secured to the underside of each product support shelf at the opposite sides thereof, and cooperating U-shaped clips 34 secured to the vertical side frame structures 20,22.

The arrangement of the pivotally mounted shelves, and the pivotally mounted side frame members 20,22 enables the transfer cart to be collapsed when not in use. At such time, the product support shelves 14 are rotated upwardly to the storage position as shown in dotted lines in FIG. 2, and are held in this position by a conventional spring latch assembly 15 (secured to the lower surface of each shelf) which bears against a structural member of the main frame. After the shelves are moved to the collapsed position, side frame members 20,22 are rotated inwardly about pivots 24,26 to positions against the inclined collapsed shelves.

Referring again to FIG. 2, it is noted that each of the product support shelves 14 is generally inclined downwardly from the front portion of the vertically extending main frame 10 to the back portion thereof. Furthermore, the vertical spacing between the product support shelves is generally designated by the letter S, and the spacing is equal between the several product support shelves. Furthermore, as illustrated in FIGS. 1-3, secured to the forward edge of each product support shelf is an elongated lip 50 that is provided for preventing inadvertent toppling of foodstuffs, such as milk containers 52 from the product support shelves. The planar surface of each product support shelf is generally corrugated, as shown by the raised portions 56 on each shelf to facilitate cleaning any liquids which may spill on the shelves. Since the shelves are inclined rearwardly, any fluid which is inadvertently spilled on the shelves flows to the rear portion of the transfer cart, away from the front lip which would be exposed to the consumer.

The gate 16 of the transfer cart generally comprises a ladder-like construction of unitary tubing, preferably of rectangular cross-section, as are the remaining portions of the frame structures of the transfer cart. The gate comprises vertically extending side members 60 and 62, which are interconnected by a plurality of generally horizontal tubular members 64. The vertical spacing between the horizontal tube member 64 corresponds to the vertical spacing S between the product support shelves. The gate is supported on the transfer cart by means of upper and lower U-shaped clip portions 70 secured to the rear vertical members of the frame structures 12,12. The arrangement of the U-shaped clips 70 and the gate 16 is such as to allow the gate 16 to be vertically slidable.

As illustrated in FIG. 3, when the gate is retracted to its fully down position, the horizontal tubular members 64 are positioned intermediate the vertical spacing between the product support shelves, whereby the tubular members 64 define a rear barrier for preventing the foodstuffs, such as milk containers 52, from toppling from the product support shelves. On the other hand, as illustrated in FIG. 2, when the gate 16 is vertically raised, the tubular member 64 may be aligned with the product support shelves, whereby the rearward opening to the transfer cart is unobstructed, thereby facilitating the loading of milk containers 52 onto the product support shelves.

FIG. 2 schematically illustrates the loading sequence, in which the transfer cart is moved to a position adjacent a loading platform 80, after which the milk containers are moved to the right, as designated by the arrows, for sliding onto the product support shelves. When a support shelf has been completely loaded, the loading platform 80 would be lowered or raised, as the case may be, for loading of the next product support shelf.

When the transfer cart has been fully loaded with milk containers 52, the gate 16 is lowered to the position illustrated in FIG. 3 and the entire transfer cart rolled, by means of wheels 90 provided at the base of the cart onto a truck for transporting to a retail outlet.

After all of the milk products have been removed from the transfer cart, the product support shelves are disengaged from the latching means 30 and pivoted generally downwardly to a vertical position, after which the side frame structures are collapsed by folding of the forward portions generally inward, and the collapsed transfer cart is returned to the plant for reloading.

It is not desired to limit the present invention to the precise details of construction and arrangement herein set forth, as it is obvious that various modifications may be made in the invention without departing from the essential features of the invention, as defined in the appended claims.

What is claimed is:

1. A transfer cart for use in transporting and displaying products such as food containers comprising:
 a vertically extending main frame having a front portion, a rear portion and including two side frame structures;
 a plurality of vertically spaced, product support shelves extending between and connected to said side frame structures, each shelf including a lip extending along the front portion of the cart; and
 a gate including a plurality of generally horizontal bars disposed along the back portion of the cart; means for slidably mounting said gate to said side frame structures for positioning between an extended and a retracted position of said gate, with the vertical spacing between said horizontal bars substantially corresponding to the vertical spacing between said shelves whereby in the retracted position of the gate, the horizontal bars thereof are disposed between said spaced product support shelves to prevent food containers from inadvertantly falling from said shelves whereas when the gate is disposed in its extended position, the horizontal bars thereof are substantially aligned with the product shelves to enable unrestricted access thereto.

2. A transfer cart as in claim 1, wherein each of said product support shelves is inclined downwardly extending from the front portion to the rear portion of said main frame.

3. A transfer cart as in claim 1 further including roller means disposed along the lower edge thereof.

4. A transfer cart as in claim 1 wherein each product support shelf is corrugated.

5. A transfer cart as in claim 1 wherein each of said product support shelves is pivotally connected to the side frames adjacent the rear portion of the main frame, and wherein each side frame structure comprises two parts pivotally interconnected, whereby the transfer cart may be collapsed when not supporting products.

6. A transfer cart for use in transporting and displaying products such as food containers comprising:

a vertically extending main frame having a front portion, a rear portion and including two side frame structures;

a plurality of product support shelves extending between and supported by said side structures, each shelf including a lip extending along the front portion of the cart, each shelf further being inclined relative to the horizontal from the front portion to the rear portion of said vertically extending main frame; and a gate including a plurality of generally horizontal bars corresponding in number to the number of product support shelves, means for slidably mounting said gate along the back portion of the cart to said side structures, with the vertical spacing between said horizontal bars corresponding to the vertical spacing between said shelves, the bars of said gate being disposed intermediate the vertical spacing between the shelves when the gate is fully retracted, whereas when the gate is extended upwardly, the bars are aligned with the shelves to enable access to the shelves from the rear portion of said vertically extending main frame.

7. A transfer cart as in claim 6 wherein each product support shelf is corrugated.

8. A transfer cart as in claim 6 wherein each side structure includes two pivotally connected sections, and wherein each product support shelf is pivotally mounted to said side frames at the rear portion of the vertically extending main frame, whereby said transfer cart may be collapsed to facilitate transporting when not supporting products.

9. A transfer cart as in claim 7 further including wheel means disposed along the bottom portion of the vertically extending main frame.

* * * * *